United States Patent

[11] 3,581,185

[72] Inventors Heinz Hermes;
Klaus-Dietrich Thieme, Wedel, Holstein;
Willi Gatermann, Hamburg; Peter Koerv, Anzing; Walter Mehnert, Munich, all of, Germany

[21] Appl. No. 784,020
[22] Filed Dec. 16, 1968
[45] Patented May 25, 1971
[73] Assignee LICENTIA Patent-Verwaltungs-G.m.b.H. Frankfurt am Main, Germany
[32] Priority Dec. 15, 1967
[33] Germany
[31] P 15 88 510.6

[54] ELECTRIC CIRCUIT FOR GENERATING A PROGRAMMABLE MULTIPHASE ALTERNATING CURRENT

9 Claims, 3 Drawing Figs.

[52] U.S. Cl. .......... 321/7, 321/61, 307/223
[51] Int. Cl. .......... H02m 5/14
[50] Field of Search .......... 321/7, 61; 307/223

[56] References Cited

UNITED STATES PATENTS

| | | | |
|---|---|---|---|
| 2,749,496 | 6/1956 | Newman et al. | 321/7X |
| 3,152,297 | 10/1964 | Peaslee | 321/61 |
| 3,177,420 | 4/1965 | Barber et al. | 321/7X |
| 3,200,321 | 8/1965 | Rosenstein | 321/61X |
| 3,324,376 | 6/1967 | Hunt | 321/61X |
| 3,256,244 | 6/1966 | Byloff et al. | 321/61 |
| 3,274,480 | 9/1966 | Walker | 321/61 |
| 3,317,811 | 5/1967 | Normando et al. | 321/7 |
| 3,391,323 | 7/1968 | Ikeda | 307/223X |
| 3,419,785 | 12/1968 | Lafuze | 321/61X |
| 3,430,073 | 2/1969 | Leonard | 307/223X |

*Primary Examiner*—William M. Shoop, Jr.
*Attorney*—Spencer and Kaye

ABSTRACT: A circuit for producing a multiphase alternating current which may be programmed in wave shape, includes a separate oscillator producing an alternating signal for each phase, a ring counter receiving the output of the oscillator whose stages deliver successive outputs which subdivide a given period, an interrogating switching circuit connected to each output of the ring counter and to a separate bar of a crossbar distribution panel for receiving a characteristic voltage from that bar and switching it to the input of an amplifier upon receiving a pulse from the associated output of the ring counter. Circuit elements for shifting the phase relationship include a bistable circuit means having a first input connected with one stage of one ring counter and a second input connected to a stage of another ring counter, an averaging circuit for averaging the output signals of the bistable circuit means, and means utilizing the said averaged signals for supplying an input signal to one of the oscillators. The frequency of the oscillator signals may be directly varied by the input signal to vary the frequency and, consequently, the phase relationship of the multiphase signal.

Fig. I

Inventors:
Heinz Hermes
Klaus-Dietrich Thieme
Willi Gatermann
Peter Koerv
Walter Mehnert By: Spencer & Kaye
Attorneys Inventors:
Heinz Hermes
Klaus-Dietrich Thieme
Willi Gatermann
Peter Koerv
Walter Mehnert
By: Spencer & Kaye
Attorneys

ELECTRIC CIRCUIT FOR GENERATING A PROGRAMMABLE MULTIPHASE ALTERNATING CURRENT

BACKGROUND OF THE INVENTION

The present invention relates to alternating current systems and more particularly to a circuit for generating a multiphase alternating current which may be programmed.

Single phase functions having adjustable wave forms for use in programming have been formed through the use of a series of electronic interrogating switches to whose input a given potential is applied. In this way a stepped function is formed whose adaptation to a given wave form is improved with an increasing number of electronic interrogating circuits. For improving the curve characteristics, a low pass filter may be subsequently added.

Conceivably, the optional function could be produced with the help of the synthesis of many individual functions. However, if the frequency is to be optionally modulatable in a desired range or is to be varied, serious difficulties usually result since the band width of the filters employed can not be easily varied. For example, with a signal having a frequency of 300 to 500 Hz. it is not possible to determine from which one of the higher harmonics the individual frequencies originate, since the frequency ranges overlap.

SUMMARY OF THE INVENTION

Among the objects of the present invention is the provision of a circuit arrangement with which three or more phase alternating currents can be produced whose wave form is optionally programmable and whose phase and frequency may be modulated.

Briefly stated, these and other objects are accomplished by providing a circuit which includes:

a. an *n*-stage ring counter for each phase, whose *n* stages subdivide *n* times in a given time interval and each of whose *n* outputs is connected with the same number of electronic interrogatory switching circuits, each interrogatory switching circuit being connected with a bar of a crossbar distribution panel. Each bar carries a certain fixed electric potential. The potential associated with a particular bar will be transferred via the interrogating switching circuit to an amplifier upon receipt of an output from this particular stage of the ring counter;

b. each phase is provided with a preferably voltage-controlled, frequency-modulatable oscillator whose output is connected with the input of the first stage of the associated ring counter;

c. $(m-1)$ bistable circuits are provided to regulate the phases with the input of the bistable circuit being connected with one stage of the $L-th$ and one stage of the $(L+1)-th$ ring counter, $L$ being any number comprised between 1 and $(m-1)$ d. the outputs of the bistable circuits are each connected to an averaging circuit which forms mean values from the output signals of the bistable circuit to derive an actual average value. A comparison circuit forms a control deviation signal which consists of the difference of the actual value from a given nominal value and supplies this control deviation signal to the oscillators as an adjustment signal.

DESCRIPTION OF THE PREFERRED EMBODIMENTS

Figure 1:
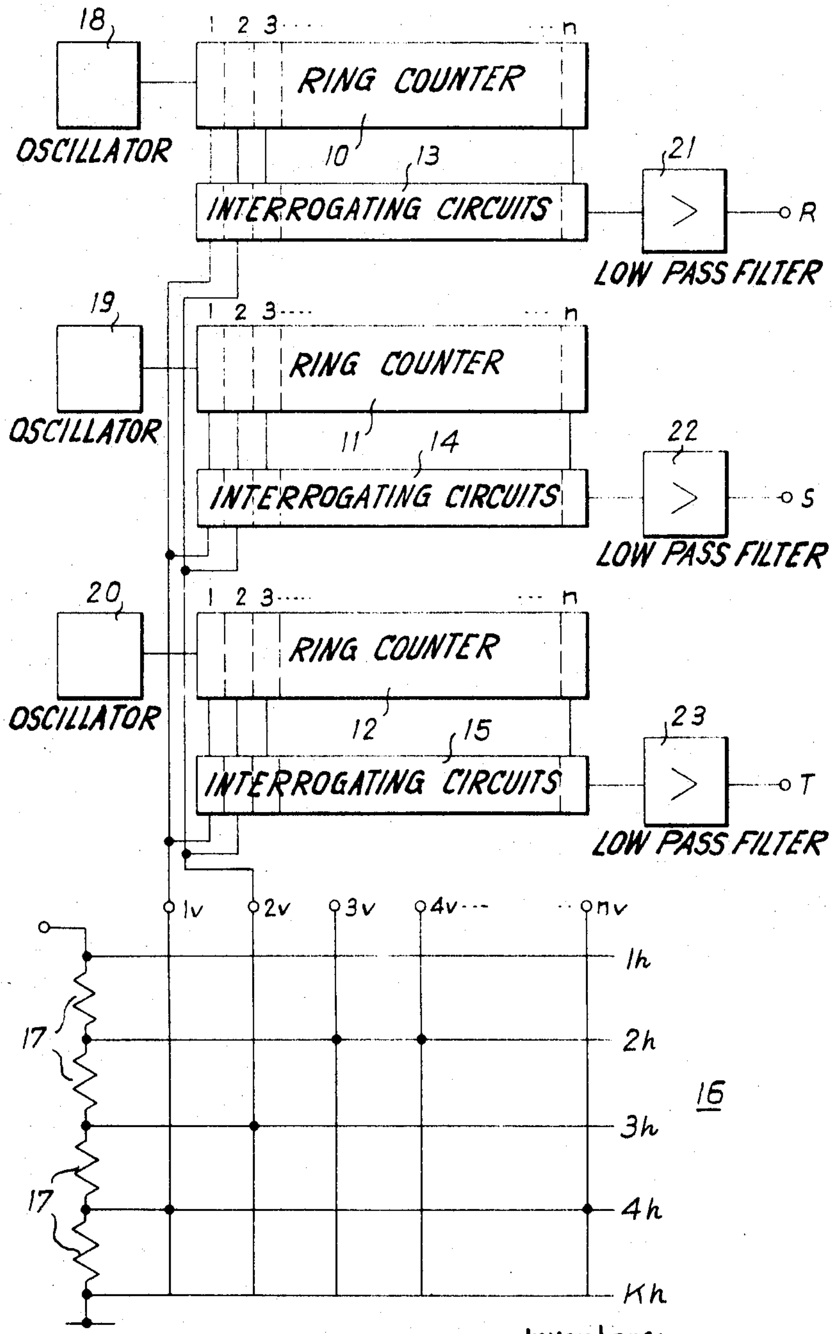
FIG. 1 shows schematically the construction of a circuit arrangement for generating a three-phase alternating current signal according to the present invention.

Referring now to the drawings, FIG. 1, ring counters 10, 11, and 12, respectively, are provided for each of the three phases R, S and T. Each ring counter has *n* stages which subdivide a period *n* times. Each of the *n* outputs of the stages is connected with an associated electronic interrogating switching circuit 13, 14 or 15. Each input of each electronic interrogating switching circuit 13, 14 or 15 is connected with a vertical crossbar, for example 1*v*, of a crossbar distribution panel 16 having *n* vertical bars. The *n* bars of the panel 16 may be held at *k* different potentials as a result of the connection of the horizontal bars to various taps of a resistance 17. For example, horizontal bar 2*h* may be connected to both vertical bars 3*v* and 4*v* so that each is at the same potential.

For each phase an oscillator 18, 19 or 20, respectively, is provided which may be voltage modulated in frequency. Each oscillator is connected with the input stage of the associated ring counter 10, 11 or 12. Each of the outputs of the electronic interrogating circuits 13, 14 and 15 is delivered to an amplifier (not shown) having a high input resistance and then to a low pass filter 21, 22 or 23, respectively, which tends to smooth the progressions of the functions formed in the phases R, S and T.

In the circuit diagram as here shown, the three functions of the phases R, S and T are identical but are shifted in phase by 120°. The wave form is optionally adjustable in the crossbar distribution panel. It is, however, possible to obtain three different wave forms for R, S and T by connecting the input of each electronic interrogating circuit 13 to 15 with the appropriate bars of three different crossbar distribution panels.

Figure 2:
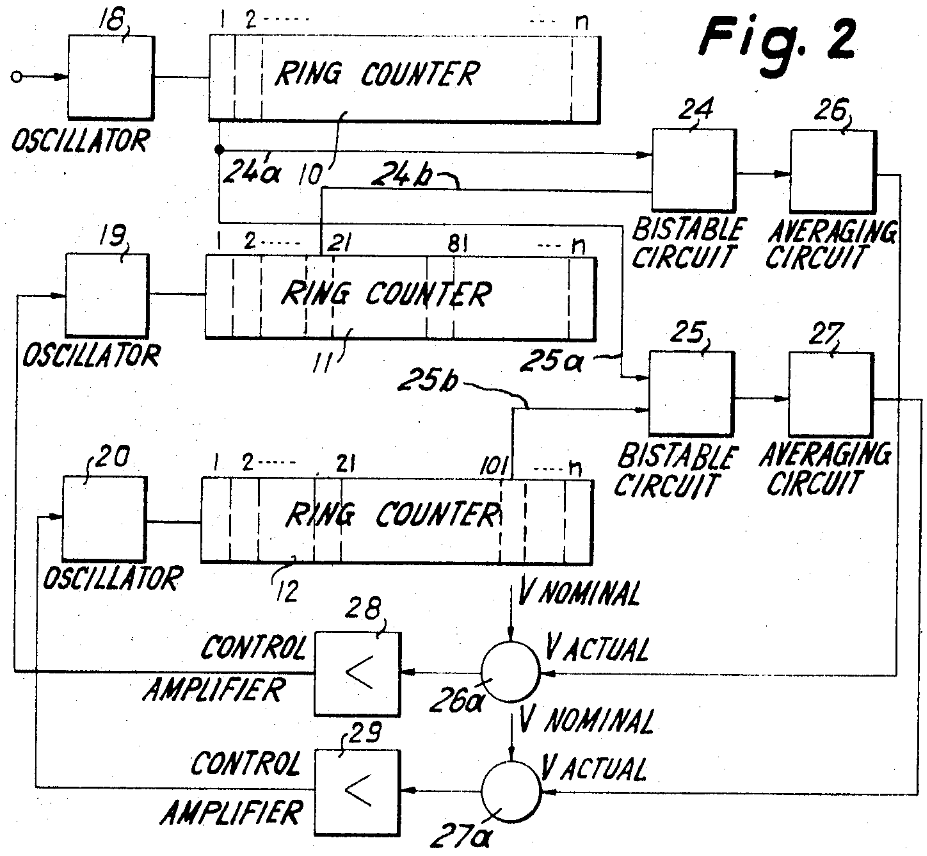
FIG. 2 shows schematically a construction of the phase-regulating portion of the circuit.

Inasmuch as a phase shift of 120° is to be maintained between the three phases R, S and T, it is advisable to regulate the oscillators 18 to 20 in an appropriate way. An example of this is shown in FIG. 2. The electronic interrogating circuits are not shown in this Figure in order to simplify the drawing and more clearly show the phase-regulation circuit elements. In order to control the relationship of the phases of S and T relative to phase R, a circuit arrangement hereafter described furnishes a control signal to the oscillators 19 and 20, respectively, so as to vary their frequency momentarily with the result of advancing or delaying the phase relationship of phases S, T relative to phase R, with which they are normally 120° and 240°, respectively, shifted in phase. The input of a bistable circuit 24 is illustrated as connected to the output of the first stage of ring counter 10. The other input to bistable circuit 24 is illustrated as connected to stage 21 of ring counter 11 in the example shown. Input 25*a* of another bistable circuit 25 is connected to stage 1 of ring counter 10 and 25*b* is connected to stage 101 of ring counter 12.

In operation inputs 24*a*, 24*b*, 25*a* and 25*b* may be optionally connected to any desired stage of the associated ring counter. In the example shown assume that there are $n$=120 stages and that phase R leads phase S by exactly 120°. Accordingly, the period subdivided by each ring counter is equal exactly to $n$=120 full cycles of the oscillators 18, 19 and 20, each of which have equal frequencies. Accordingly, output pulses are delivered simultaneously from stage 1 of ring counter 10, stage 81 of ring counter 11, and stage 41 of ring counter 12. Also, the phase relation between stage 1 of the ring counter 10, and stage 21 of ring counter 11 is 180°. Thus the input 24*a* to the bistable 24*b* will set this circuit, and the input 24*b* will reset the circuit at 0° and 180°, respectively. The output of the bistable circuit 24 is of rectangular wave shape and may take the values +1 for the set state, −1 for the rest state. Consequently, under the assumed conditions, the average value of the output signal as determined by the averaging circuit 27, is equal to zero. Bistable circuit 24 may be a conventional flip-flop circuit of bipolar output, and averaging circuit 26 may be a conventional L–C low pass filter. The bistable circuit 25 which receives pulses at different times from stage 1 of ring counter 10, and from stage 101 of ring counter 12, as well as the averaging circuit 27 are of the same type as the circuits 24 and 26, respectively. At the output of circuit arrangement 24 there is produced a rectangular function whose average value with proper phase relationship is 0. The output of bistable circuit 24 is delivered to an averaging circuit 26 and the output of bistable circuit 25 is delivered to a similar averaging circuit 27. The average value formed appears in the circuit 26 or 27. The average voltage formed, $V_{actual}$, is compared with a nominal voltage $V_{nominal}$ in comparison circuits 26*a* or 27*a*, respectively. In the given example, both voltage values are equal to zero. The resulting control deviation is given to control amplifier 28 or 29 as an adjustment signal. The control deviation is obtained in comparison circuits 26*a* or 27*b* by subtraction of $V_{nominal}$ from $V_{actual}$. The control amplifiers 28 or 29 amplify the control deviation signals, and these amplifiers in turn deliver voltage signals to the oscillators 19 or 20 respectively. As a consequence the phase relation between output frequencies of oscillators 19, 20 compared to output frequency of oscillator 19 as well as the phase relation between phases S and T compared to phase R, are altered. The voltage controlled oscillators may be of the standard telemetry type called VCO as manufactured by Electro-Mechanical Research, Inc., Sarasota, Florida, as "Model 236–A."

With deviation of the phase shift of 120° there results an average value, and consequently a control deviation signal, having a negative or positive value differing from 0 so that the oscillators 19 and 20 are correspondingly shifted. In order to obtain any other given phase shift, the nominal voltage must be chosen to have any other appropriate different value. In regulating the phase it is desirable to consider the individual phases with reference to one function. In this case, the functions of phases S and T are indicated with reference to the function of phase R.

To improve the phase regulation, it is possible to connect several stages of a ring counter to the associated bistable circuit arrangement. Thus, the mean value and consequently the actual values are formed in shorter intervals.

Figure 3:
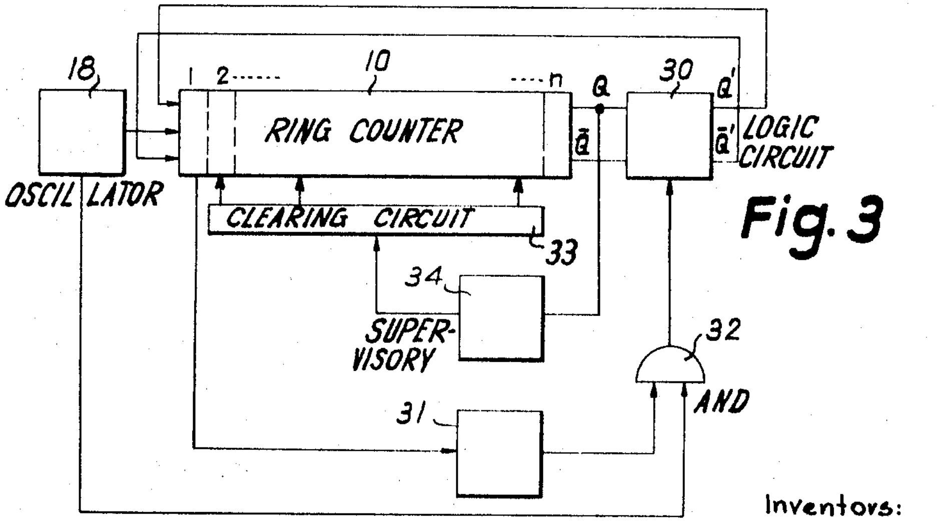
FIG. 3 shows schematically the circuit used for monitoring the pulses received from a ring counter.

FIG. 3 shows a circuit for monitoring the pulses in the ring counters and with it a monitoring of the proper control of the interrogatory circuits. Only the monitoring of the phase R is illustrated. The electronic interrogatory circuits associated with the ring counter 10 and the phase-regulating circuits previously described are also omitted from the illustration. A logic circuit 30 is connected to the output of the ring counter 10, which switches back the last stage of the ring counter to the first stage upon receipt of a ring counter pulse from the last stage. The ratio of the input to the output signal is here given with $Q–Q'$ or $\overline{Q}–\overline{Q'}$, respectively. A monitoring circuit 31 is also connected with the input stage of ring counter 10 and it picks up the pulses which normally recur at given intervals in this step. Monitoring circuit 31 may include a capacitor which is connected to a direct current source and which may be short-circuited by a transistor switch. If no pulse comes to the monitoring circuit 31 within a given time period, the capacitor will exceed the threshold voltage necessary to gate and AND-circuit element 32. AND-element 32 delivers a signal to the logic circuit 30 if the second AND condition, namely the switching in of the oscillator 18, is likewise fulfilled. At the output of the logic circuit arrangement 30 there then appears a pulse which is delivered to the input stage of the ring counter 10. In this way it is assured that the desired functions are continuously produced without interruption. In order to assure that no pulse is left in ring counter 10, once a ring counter pulse has reached the output stage, a clearing circuit 33 is provided which is controlled over a supervising circuit 34. Circuit 34 is connected to the output of ring counter 10. If a pulse appears at the output, all stages except the first and the last stage of the ring counter 10 will be cleared. However, if no pulse appears at the output of ring counter 10, then it is assumed that no pulses are present in the preceding stages either.

OPERATION

Oscillators 18, 19 and 20 normally deliver signals to the ring counters 10, 11, 12. Pulses are delivered from the separate stages 1, 2, 3 ....*n* of the ring counter 10 in sequence in equal time intervals to the associated interrogating circuit associated with each output, the time intervals being equal to one period of the oscillator signal each. At the time when the interrogating circuit receives a pulse, the associated vertical bar of the crossbar distribution panel 16 is switched to the output of the interrogating circuit producing phase R. The same output signal will be produced in phases S and T at different times if their interrogatory circuits 14 or 15 are connected to the same crossbar distribution panel.

The phase-regulating circuits are so constructed that the $L–th$ control deviation is supplied as an adjustment to the $(L+1$ $–th$ of the $m$ oscillators, $L$ being any number between 1 and $(m–1)$. The magnitude and polarity of the signal appearing at the output of the $L–th$ circuit arrangement forming the mean value are a direct indication of the phase relationship of the functions produced between a reference ring counter, and the $(L+1)–th$ ring counter.

Comparison of a desired signal then results in a control deviation signal which can be supplied to the oscillator associated with the $(L+1)–th$ ring counter as an adjustment signal. The phase relationship of the individual functions to one another are here advisably considered with reference to the function of a single ring counter. In the examples, the first ring counter is taken as the reference ring counter.

The frequency of the alternating current system is adjusted over the modulatable oscillator 18 with the frequency of the other oscillators 19, 20 being controlled to conform to this frequency. The wave shape can be arbitrarily set in the crossbar distribution panel by supplying signals of the desired voltage to the appropriate interrogatory circuit as they are scanned. Advisably, the amplifier (not shown in FIG. 1) connected with the interrogatory switch which ultimately forms the outputs of the phases should be formed with a high input resistance and a low pass characteristic, which is achieved by the additional low pass filters 21, 22, 23 shown in FIG. 1.

The stages of the ring counter which are connected with the bistable circuit arrangements are selected so that their signals are shifted 180° in phase. This means that the average value in the individual phase relationship amounts to 0. A given phase shift can be accomplished in that an appropriate signal is superimposed over the nominal value.

To monitor the faultfree operation of the circuit of this invention, it is further suggested that the last stage of each ring counter be connected with a logic circuit which switches the ring counter pulse of the last stage back to the first stage. The logic circuit is also controlled by a supervisory circuit 34 in such a way that the logic circuit gives out a pulse when no pulse has appeared for a given time at the input of the ring counter. This given time can also be made dependent on the adjustment signal given to the respective oscillator. The transit time through a ring counter is dependent in turn on the given frequency.

In case no pulse appears at the output of the ring counter, pulse regeneration must be provided for. The monitoring circuit 31 picks up the pulses at the end of the ring counter and activates the logic circuit when no pulse has appeared at the input of the ring counter in a given time period. The logic circuit produces a new pulse and delivers it to the input of the ring counter. An additional condition for the production of a new pulse is a requirement that the oscillator associated with the ring counter be switched on.

In order to assure that no pulse is left in the ring counter when the last counter stage is reached, all stages of the ring counter 10 are connected with an associated clearing circuit 33 which clears all pulses if a pulse is present at the output of the final stage.

It will be apparent that there has been provided a circuit arrangement with which a three or more phase alternating current can be produced whose wave form is optionally programmable and whose phase and frequency are optionally modulatable.

It will be understood that the above description of the present invention is susceptible to various modifications, changes and adaptations.

We claim:

1. An electric circuit for generating an alternating current signal having $m$ phases, where $m$ is at least equal to three, which can be arbitrarily programmed with respect to its wave shape and arbitrarily modulated with respect to its frequency and/or phase position comprising in combination:

a. a ring counter means having $n$ stages associated with each phase, whose $n$ stages subdivide a period $n$ times, and each stage of which has an output;

b. interrogatory circuit means connected to each output of the ring counter;

c. a crossbar distribution panel having $n$ bars, and means connecting each interrogatory circuit with one of the bars, and means supplying a specified electric potential to each bar;

d. amplifier means associated with each interrogatory circuit means;

e. means for switching the interrogatory circuit means to the amplifier means;

f. oscillator means associated with each phase and means connecting the output of each oscillator with the first stage of an associated ring counter.

2. The circuit of claim 1 including:

g. $(m-1)$ bistable circuit means for shifting phase with the input of the $L-th$ bistable circuit means connected with one stage of one ring counter taken as a reference, and with one stage of the $(L+1)-th$ ring counter;

h. averaging circuit means associated with each bistable circuit means for forming an average actual value from the outputs of the bistable circuits and for delivering a control deviation signal comprising the difference between the said actual value and a supplied nominal value to the $(L+1)$-th oscillator.

3. A circuit according to claim 1 in which the connections of the stages of the ring counter with the associated bistable circuit means are so arranged that the signals are displaced 180° in phase.

4. A circuit according to claim 1 in which the last stage of each ring counter is connected with a logic circuit means for switching back the last stage of the ring counter to the first stage of the ring counter and monitoring circuit means connected to the first stage of the ring counter means for initiating a pulse from the logic circuit when no pulse appears at the input of the ring counters in a given time.

5. A circuit according to claim 1 including clearing circuit means for clearing the pulses of all but the first and last stages of a ring counter when a pulse is delivered from the last stage of the ring counter.

6. An electric circuit for generating an alternating current signal having $m$ phases, where $m$ is at least equal to three, which can be arbitrarily programmed with respect to its wave shape and arbitrarily modulated with respect to its frequency and/or phase position comprising in combination:

$m$ oscillator means one of which is associated with each phase and each delivering an alternating signal;

ring counter means connected to the output of each oscillator including means for subdividing a given period into $n$ stages and delivering $n$ successive outputs;

a bistable circuit means having a first input connected to a stage of one ring counter, and a second input connected to a stage of another ring counter;

averaging circuit means for forming an average value from the output of the bistable circuit and for delivering an output signal to one of the oscillators to shift the phase of its signal relative to another oscillator.

7. The circuit of claim 6 in which there are $(m-1)$ bistable circuit means each having its first input connected to a common reference ring counter and its second input connected to a different ring counter and in which the output signal of each bistable circuit is furnished to the oscillator associated with the ring counter to which the second input of the bistable circuit means is attached.

8. The circuit of claim 6 in which the means for delivering the signal to the oscillator includes means for supplying a desired nominal voltage to the actual output of the said averaging means and for supplying the difference between said actual output and said nominal voltage to the oscillator means.

9. The circuit of claim 6 in which the connections of the stages of the ring counters with the bistable circuit are so selected that the signals are displaced 180° in phase.